D. W. KIRBY.
CUSHION TIRE.
APPLICATION FILED NOV. 24, 1920.

1,383,818. Patented July 5, 1921.

Inventor
Dee W. Kirby,
By Watson E. Coleman
Attorney

UNITED STATES PATENT OFFICE.

DEE W. KIRBY, OF GURDON, ARKANSAS.

CUSHION-TIRE.

1,383,818.  Specification of Letters Patent.  Patented July 5, 1921.

Application filed November 24, 1920. Serial No. 426,206.

*To all whom it may concern:*

Be it known that I, DEE W. KIRBY, a citizen of the United States, residing at Gurdon, in the county of Clark and State of Arkansas, have invented certain new and useful Improvements in Cushion-Tires, of which the following is a specification, reference being had to the accompanying drawings.

This invention relates to certain improvements in cushion tires, and it is an object of the invention to provide a device of this general character having novel and improved means whereby the same, when in applied position, serves to effectively absorb the shocks and jars incident to travel.

It is also an object of the invention to provide a novel and improved device of this general character including a casing or carcass having arranged interiorly thereof a cushioning means constructed in a manner whereby said cushioning means possesses the greatest yield at substantially the center of the interior of the casing or carcass.

Another object of the invention is to provide a device of this general character with novel and improved cushioning means, said cushioning means being arranged or constructed in a manner to effectively resist lateral or side stress on the tire.

The invention consists in the details of construction and in the combination and arrangement of the several parts of my improved cushion tire whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein.

As disclosed in the accompanying drawings, C denotes the casing or carcass of a tire of conventional type and in which is arranged a plurality of cushioning elements E, each substantially in the form of a cross.

Each of the cushioning elements E embodies a pair of oppositely directed arms 1 which, when the element is applied, is arranged within the casing or carcass C and extending radially thereacross, whereby a pillar is provided to effectively resist the load imposed upon the wheel structure to which the tire is applied when said pillar is riding over the ground or other surface.

The arms 1 are of rubber or other yieldable material possessing a desired degree of resistance and the outer end portions 2 of the arms 1 are enlarged both laterally and circumferentially with respect to the carcass or casing C and whereby each of said end portions 2 is substantially in the form of a pyramid with the apex end inwardly directed.

The outer face of each of the portions 2 is formed in a manner to have close contact with the adjacent inner face or wall of the casing or carcass C, whereby the arms 1, or more particularly the end portions 2, may be vulcanized or otherwise suitably secured to the casing or carcass C.

The inner end portions of the arms 1 result in the pillar having its central portion provided with an elongated restricted part and which part possesses greater yieldability than the end portions 2 and therefore expands to a greater degree when subjected to load so that the maximum of cushioning action is obtained at substantially the center of the interior or bore of the casing or carcass C and which, in practice, has been found to be of decided advantage in compensating for or absorbing the shocks and jars incident to travel.

Figure 1:
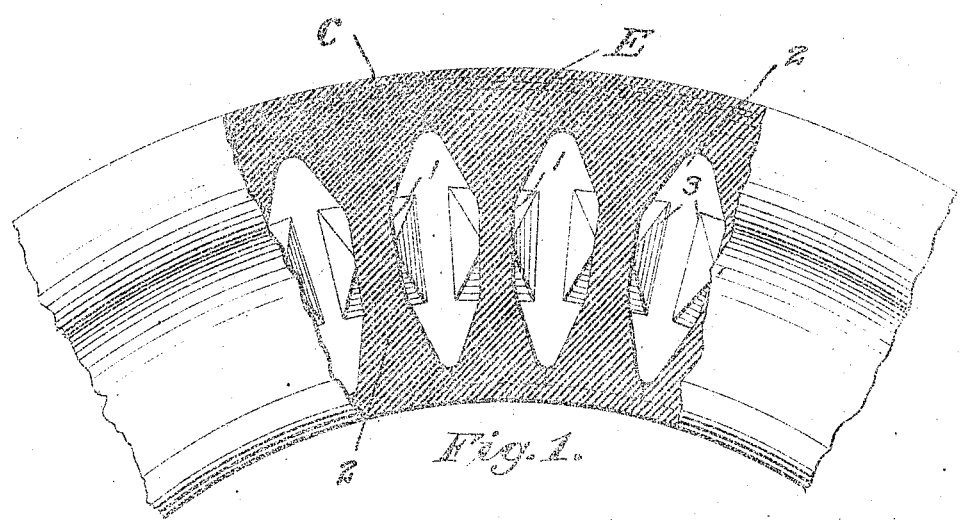
Figure 1 is a fragmentary view, partly in side elevation and partly in section, of a tire constructed in accordance with an embodiment of my invention.
Figures 2, 3:
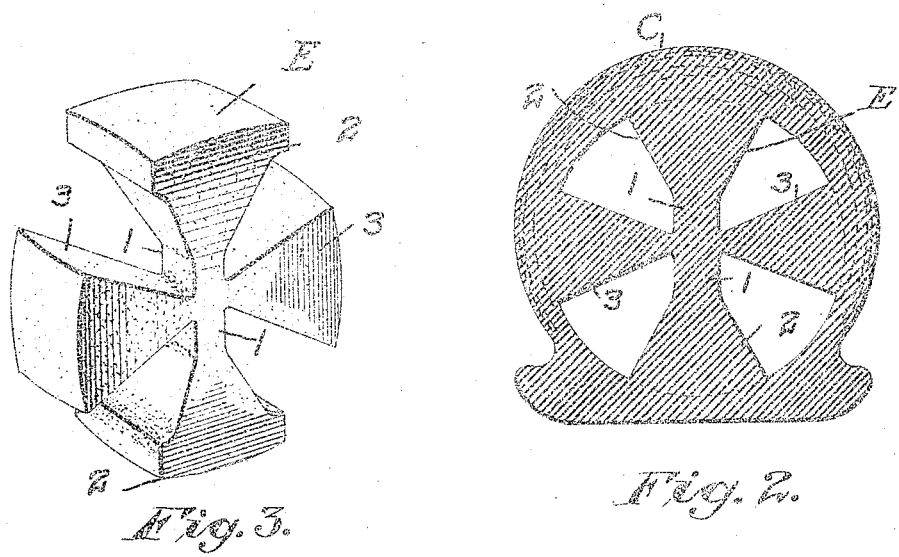
Fig. 2 is a transverse sectional view taken through my tire as herein embodied.
Fig. 3 is a view in perspective of one of the cushioning units or elements as herein employed.

It has also been found of particular advantage to have the outer faces of the portions 2 of such dimensions in a direction circumferentially of the casing or carcass C that the portions 2 of adjacent elements are in contacting relation as is clearly indicated in Fig. 1 and whereby the tread portion of the casing or carcass is effectively cushioned at all points circumferentially of the casing or carcass C.

It has also been found of particular advantage to provide means to cushion the casing or carcass C against lateral or side stress and, as herein embodied, the oppositely directed and laterally disposed arms 3 are provided, each substantially in the form of a pyramid with their apex portions inwardly directed and preferably integrally formed with the arms 1 at their junction. The outer face of each of the arms 3 is so formed as to have close contact with the inner wall of the casing or carcass C at a side thereof so that said arms 3 may be vulcanized or otherwise secured to the casing or carcass C.

It is to be understood that the resistance or cushioning action offered by the arms 3 is less than that of the arms 1 so that no hindrance or obstruction will be offered to the desired functioning of the arms 1. However, the arms 3 possess sufficient resistance or strength to effectively offset undue lateral or side strain as the result of skidding or the like so that the casing or carcass C will be prevented from accidental displacement from the rim or the like to which it may be applied.

By having the arms 3 substantially in the form of a pyramid, as hereinbefore stated, it is to be noted that the yield of the arms 3 is greater at the center of the interior or bore of the casing or carcass C and gradually increasing toward the casing or carcass C and which, in practice, has been found to materially increase the efficiency of the tire.

From the foregoing description it is thought to be obvious that a cushion tire constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A tire comprising a carcass and a plurality of cushioning elements arranged within the carcass and extending circumferentially therearound, each of said elements being cruciform and extending transversely of the carcass, the outer end portions of the arms of the elements being substantially pyramidal in form with the apex portions inwardly directed.

2. A tire comprising a carcass and a plurality of cushioning elements arranged within the carcass and extending circumferentially therearound, each of said elements being cruciform and extending transversely of the carcass, the outer end portions of the arms of the elements being substantially pyramidal in form with the apex portions inwardly directed, opposed arms of each of the elements being alined in a direction radially of the carcass, the remaining arms being opposed and extending transversely of the carcass.

3. A tire comprising a carcass and a plurality of cushioning elements arranged within the carcass and extending circumferentially therearound, each of said elements being cruciform and extending transversely of the carcass, the outer end portions of the arms of the elements being substantially pyramidal in form with the apex portions inwardly directed, opposed arms of each of the elements being alined in a direction radially of the carcass, the remaining arms being opposed and extending transversely of the carcass, the inner portions of the first named arms providing an elongated restricted part.

4. A tire comprising a carcass and a plurality of cushioning elements arranged within the carcass and extending circumferentially therearound, each of said elements being cruciform and extending transversely of the carcass, the outer end portions of the arms of the elements being substantially pyramidal in form with the apex portions inwardly directed, opposed arms of each of the elements being alined in a direction radially of the carcass, the remaining arms being opposed and extending transversely of the carcass, the inner portions of the first named arms providing an elongated restricted part, the second pair of opposed arms being connected at the junction portion of the first named arms.

In testimony whereof I hereunto affix my signature.

DEE W. KIRBY.